(12) United States Patent
Sahita et al.

(10) Patent No.: US 9,405,570 B2
(45) Date of Patent: Aug. 2, 2016

(54) LOW LATENCY VIRTUAL MACHINE PAGE TABLE MANAGEMENT

(75) Inventors: Ravi L. Sahita, Beaverton, OR (US); David M. Durham, Beaverton, OR (US); Gilbert Neiger, Portland, OR (US); Andrew V. Anderson, Forest Grove, OR (US); Scott D. Rodgers, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 13/341,891

(22) Filed: Dec. 30, 2011

(65) Prior Publication Data

US 2013/0174147 A1    Jul. 4, 2013

(51) Int. Cl.
*G06F 9/455* (2006.01)

(52) U.S. Cl.
CPC .. *G06F 9/45558* (2013.01); *G06F 2009/45583* (2013.01)

(58) Field of Classification Search
None
See application file for complete search history.

(56) References Cited

U.S. PATENT DOCUMENTS

| 7,996,833 | B2 * | 8/2011 | de Dinechin et al. ............ 718/1 |
| 8,032,897 | B2 * | 10/2011 | Serebrin ............ G06F 12/0292 710/260 |
| 2009/0113110 | A1 * | 4/2009 | Chen et al. ..................... 711/6 |

* cited by examiner

Primary Examiner — Gregory A Kessler
(74) Attorney, Agent, or Firm — Thomas R. Lane

(57) ABSTRACT

Various embodiments of this disclosure may describe method, apparatus and system for reducing system latency caused by switching memory page permission views between programs while still protecting critical regions of the memory from attacks of malwares. Other embodiments may be disclosed and claimed.

3 Claims, 3 Drawing Sheets

System 200

LOW LATENCY VIRTUAL MACHINE PAGE TABLE MANAGEMENT

TECHNICAL FIELD

The present disclosure generally relates to the field of information processing, in particular, to virtualization of resources in information processing systems.

BACKGROUND

Traditional Operating Systems (OSes) may operate under several privilege levels, which for some implementations, are also referred to as ring levels. Among these ring levels, protected programs, such as parts of the kernel, usually operate at the highest privilege level (e.g., ring 0), and unprotected programs, such as user level applications, usually operate at a lower privilege level (e.g., ring 3). The ring-based privilege model may shield the protected programs from the unprotected programs. However, assigning all the protected programs into the same ring level is a monolithic protection model. As such, such operating environments may still be vulnerable to attacks from malwares (virus/rootkits) that are able to gain the higher privilege levels. Once a malware is elevated to the higher privilege level (e.g., ring 0), it may have the ability to intercept and alter system information, and may remove all traces of its existence, thereby preventing the detection of the malware. As such, malwares such as rootkits may be difficult to detect. In certain cases, even if detected, remediation or removal of these malwares may be difficult. The exposure is further magnified in the context of virtualization with multiple virtual machines, where compromise in one virtual machine may put the other virtual machines at risk.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION OF ILLUSTRATIVE EMBODIMENTS

Figure 1:
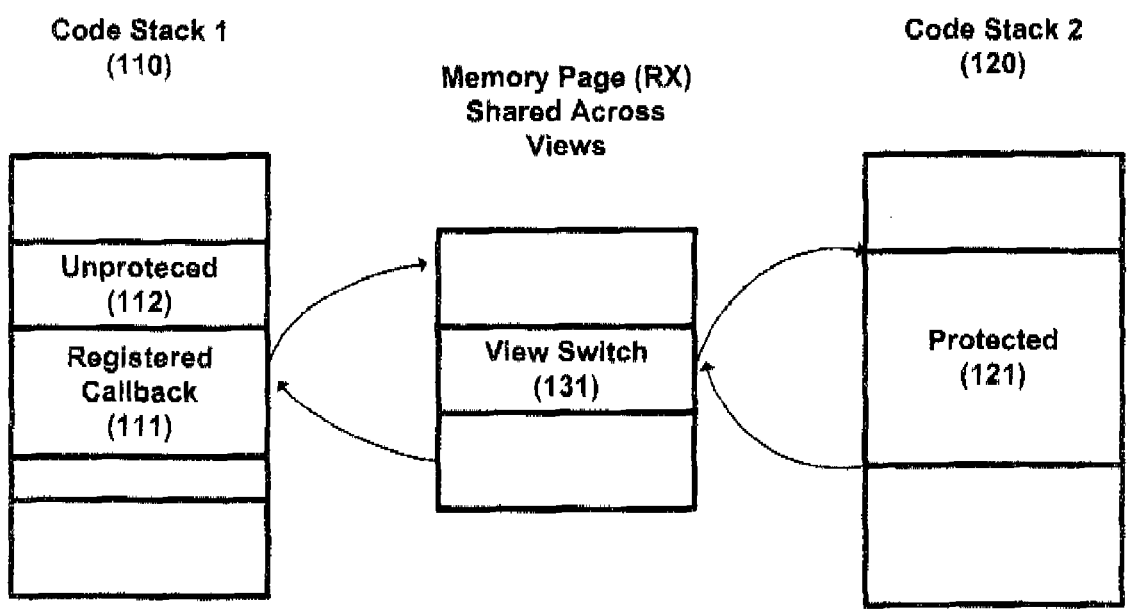
FIG. 1 is a block diagram illustrating an example usage of a memory view switch instruction, in accordance with various embodiments of the present disclosure.

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Unless otherwise specified in the present disclosure, the term "processor" refers to physical computer chips and integrated circuits, which may be fabricated using semi-conductive and conductive materials. An example of processor is a central processing unit (CPU) manufactured by Intel Corporation. Further, unless otherwise specified in the present disclosure, a processor may include one or more processing units, which may be referred to as "cores" of the processor.

Unless otherwise specified in the present disclosure, the terms such as "program," "process," "thread," "stub," "code," and the like refer to a path of execution by a processor or by a core of a processor, and may be considered synonymous.

Various embodiments of this disclosure may describe a method, apparatus and system associated with reducing system latency when switching memory page permission views between programs, to protect critical regions of memory from attacks of malwares.

With the advancement in virtualization technology, a virtual machine manager (VMM) managing multiple virtual machines operating on a computer system may provide fine-grained protection for the computing system, while maintaining compatibility with the traditional operating system and its privilege based protection scheme. Programs in such a virtualized system may operate, in addition to the traditional privilege levels, in a virtual machine extension (VMX) root mode or a VMX non-root mode. The VMM may allow programs running at the VMX root mode to monitor and protect resources accessed by programs operating at the VMX non-root mode. The VMM may also manage a hardware based page table that facilitates translation of guest physical memory addresses to host physical memory addresses of a memory of the computer system. An example of this hardware based page table may include the Extended Page Tables (EPT) available in certain processors manufactured by Intel Corporation at Santa Clara, Calif.

In various embodiments, the VMM may be configured to protect one or more physical memory pages of the memory by restricting access to these memory pages. A system root agent operating in the VMM-root mode may be established by the VMM so that any attempts to write to any of the protected host memory pages where the system root agent resides may be trapped by the processor and reported to the VMM as a violation. Unless otherwise specified in the present disclosure, the term "host memory page," or "memory page" in short, refers to memory pages mapped to the physical memory of a computing system that is managed by the VMM and/or the EPT, not virtual memory pages managed by a particular virtual machine (VM) and/or its page table.

In various embodiments, once the system root agent is up and running, it may set up additional protections for other memory regions of the system. For example, the system root agent may restrict the ability of a process to read, write, and/or execute contents stored in a host memory page. These restrictions to access the host memory pages may be referred to as permission views. Permission views of the one or more memory pages may be encoded in the EPT, and controlled by the VMM. Therefore, the VMM may enforce these views (i.e., permissions) regardless of the permissions conferred to a process within a guest OS. For example, the guest OS may grant both a kernel driver A and a kernel driver B full access to a particular memory page. However, permission views set up by the system root agent, encoded in the EPT, and enforced by the VMM may allow only the kernel driver A to have full access to the host memory page, and allow kernel driver B to have read-only access. Resultantly, the VMM may further restrict the privileges granted by the guest OS.

In various embodiments, an access violation to a memory page based on the permission view may raise an exception, and may cause control to be transferred to the VMM. For example, when a thread of execution enters into a protected guest OS program, an access violation may trigger a fault or a trap, (for example, an EPT fault), which may cause execution control to be transferred to the VMM. In various embodiments, execution control may be transferred from the guest OS to the VMM due to a vmexit call, which may be triggered due to the EPT fault. A permission view handler in the VMM may then analyze the access violation to determine whether the access may be denied or granted. Not all permission violations may indicate a malware infection. For example, the permission view handler may verify whether the destination guest linear address associated with the access event that triggered the execution control transfer is a legitimate destination. Upon verification, the permission view handler may switch the active EPT, or a portion of it, to an EPT that allows execution of the process at the destination guest linear address. In various embodiments, the VMM's permission view handler may change the permission views associated with a memory page by modifying the active EPT to allow the memory access to go through. In various embodiments, after the memory access is completed, the VMM may transfer control back to the guest OS, for example, via a vmentry call.

In various embodiments, encoding permission view in the EPT may define protection of critical system regions in a process by process manner, and reduce the likelihood of malware attacks. However, generating an exception, e.g., an EPT fault, on each access violation may cause legitimate permission view switches to go through two VM exit round trips (e.g., vmexit and vmentry calls), which may cause additional delay in execution.

In various embodiments, the processor of the computing system may be configured to support an explicit permission view switch instruction (view switch instruction) that may be used to reduce the overhead, and therefore, the latency of switching the permission views.

FIG. 1 is a block diagram illustrating an example usage of a view switch instruction, in accordance with various embodiments of the present disclosure. In various embodiments, a first code stack 110 may include an unprotected program 112 and a registered callback 111 which is associated with a protected program 121. The protected program 121 may reside in a second code stack 120. The unprotected program 112 may access the protected program 121 and its service via the registered callback 111. The unprotected program 112, by default, may have a read-only permission view for the host memory page (not shown) that contains the protected program 121. The unprotected program 112 therefore may not have permission to directly execute the protected program 121 under its own permission view.

In various embodiments, the callback routine 111 may invoke one or more view switch instructions 131 to allow the unprotected program 112 to switch to a permission view of the protected program 121, thereby negating the need and overhead of e.g., a vmexit call. Similarly, the protected program 121 may also invoke the one or more view switch instructions 131 to allow the protected program 121 to safely exit and switch back to the unprotected program 112, thereby negating the need, and overhead of e.g., a vmentry call. In various embodiments, at least a portion of the memory page that contains the one or more view switch instructions 131 may share a read/execute permission view for both the protected program 121 and the unprotected program 112.

In various embodiments, as illustrated in FIG. 1, the view switch instructions 131 may reduce system latency so long as the need to enter into or exit from the protected program 121 may be predicted a priori, such as when invoked in the registered callbacks 111. However, asynchronous events, such as interrupts, may happen anytime during executions of protected or unprotected programs. When the processor receives a notification that an interrupt occurred, the processor may jump to, or trigger execution of, an interrupt handler routine that is associated with the interrupt. The address of the interrupt handler routine may be found in an interrupt description table (IDT) maintained by a guest OS. The processor may attempt to execute the interrupt handler to service the interrupt. However, if the permission views of the interrupt handler and the program that is interrupted (the "interrupted program") are different, an access violation may still occur, causing an exception to be raised, and the execution control to be transferred to/from the VMM via the vmexit and/or vmentry calls, which may lead to extra delay.

In one embodiment, the view switch instruction may be a VMCALL leaf. This approach may be desired because it allows software to implement page table management with VMCALL instructions, which may be used to perform view switches when supported by the hardware.

In one embodiment, a permission-view-switch leaf field may be used by the VMM to specify the value expected to be used by guest software in a specific register during the invocation of the view switch instruction to cause the processor to load an alternate permission view programmed by the VMM from an alternate-permission-view-list. The alternate-permission-view list may be a data structure in system memory referenced by an 8-byte-aligned 64 bit physical address specified by the processor, to store a list of alternate permission view values, which all apply to the active guest. One of these alternate values may be selected at run time by guest software via a view switch instruction. There are no limitations on the values that can be written for the alternate permission view values.

In one embodiment, use of the view switch instruction may also involve an alternate-permission-view list. The alternate-permission-view-list count may be 32-bit value stored in a field in system memory.

An execution of view-switch instruction in VMX non-root mode may load an alternate permission view without a VM exit under the following conditions:

The guest software supplied operand is equal to the value of the permission-view-switch leaf VM-execution control field programmed by the VMM. The operand may be a register or an immediate value.

The guest software supplied view selector operand contains an index that is less than the alternate-permission-view-list count programmed by the VMM. If the alternate-permission-view-list count is n, only the first n alternate-permission-view values are considered; if the alternate-permission-view-count is 0, the view-switch instruction causes a VM exit. The operand may be in memory or in a register.

Also, VM entry fails if the alternate-permission-view-list count is greater than that allowed by the processor. Software may read a processor machine specific register to determine the maximum number of values supported.

If execution of the view-switch instruction does not cause a VM exit, and if the selected alternate-permission-view value does not have any bits set and passes physical memory consistency checks, then the processor may set the permission-view value being used to the alternate-permission-view value. Fetching the next instruction after the permission view is changed may cause a permission view violation and VM exit if the page from which the next instruction is fetched is not executable based on the new permission view.

Therefore, embodiments of the present invention provide for an anti-malware agent in a guest OS to operate in a VM with low latency by using the view switch instruction to avoid a VM exit.

The anti-malware agent may interpose its code using filter application programming interfaces (APIs) provided by the OS vendor. The anti-malware agent may use the explicit view switch instructions in the instrumentation code that the agent inserts as part of the callbacks registered with the OS code. The anti-malware agent code pages on which the view switch instructions are present may be set to have read-execute permissions and be shared in all the views across which a switch is to be allowed—these access properties may enforced by the VMM. Additionally, any executable code that is shared across views is checked for spurious view-switch instruction byte sequences that may occur in the code pages. Any malicious usage of the view switch instruction may cause an EPT fault which will invoke the VMM.

Figure 2:
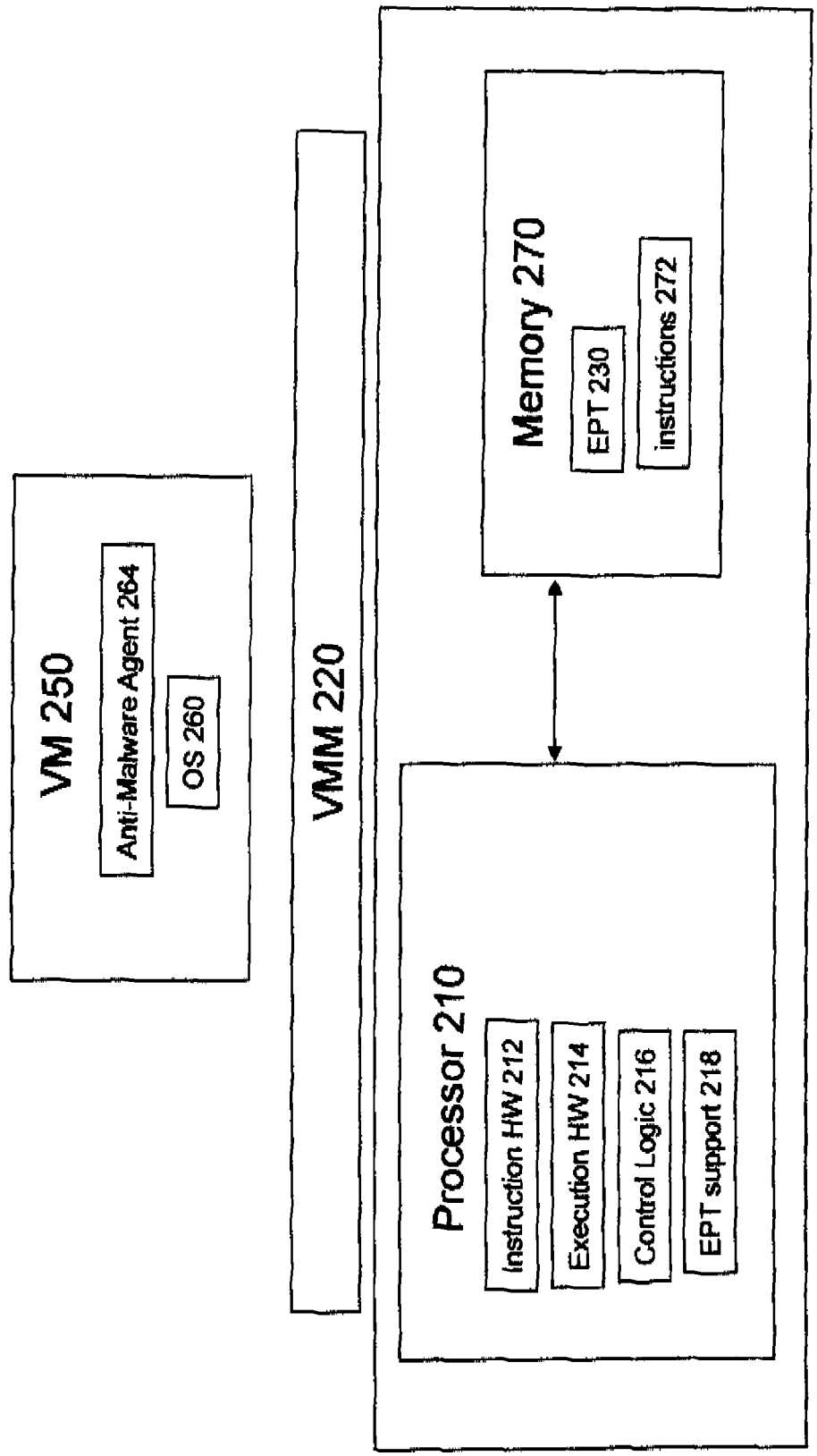
FIG. 2 illustrates a block diagram of a system illustrates a view of a system in which embodiments of the present invention may be present and/or operate.

FIG. 2 illustrates a view of a system in which embodiments of the present invention may be present and/or operate. System 200 may include a processor 210 configured to operate a VMM 220. The processor 210 may include multiple processing cores, and may also include support 218 for an EPT 230. Processor 210 may include instruction hardware 212 to receive instructions (including the view switch instruction), execution hardware 214 to execute instructions (including the view switch instruction), and control logic 216 to control the operation of instruction hardware 212, execution hardware 214, and the remainder of processor 210.

In various embodiments, the VMM 220 may be configured to manage the EPT 230. In various embodiments, the processor 210 may be configured to support a plurality of VMs, under the management of VMM 220, including a VM 250 as illustrated in FIG. 2. In various embodiments, during operation, a guest OS 260 may be operated within the VM 250. The guest OS 260 may be configured to operate a plurality of protected and unprotected programs. One of the protected programs may be an anti-malware agent 264. The anti-malware agent 264 may be configured to use the view switch instruction according to embodiments of the present invention.

System 200 may also include system memory 270, which may be used to store a working copy of programming instructions, including instances of the view switch instruction, implementing one or more VMMs, OSes, firmware modules or drivers, applications, and so forth, herein collectively denoted as 272.

Figure 3:
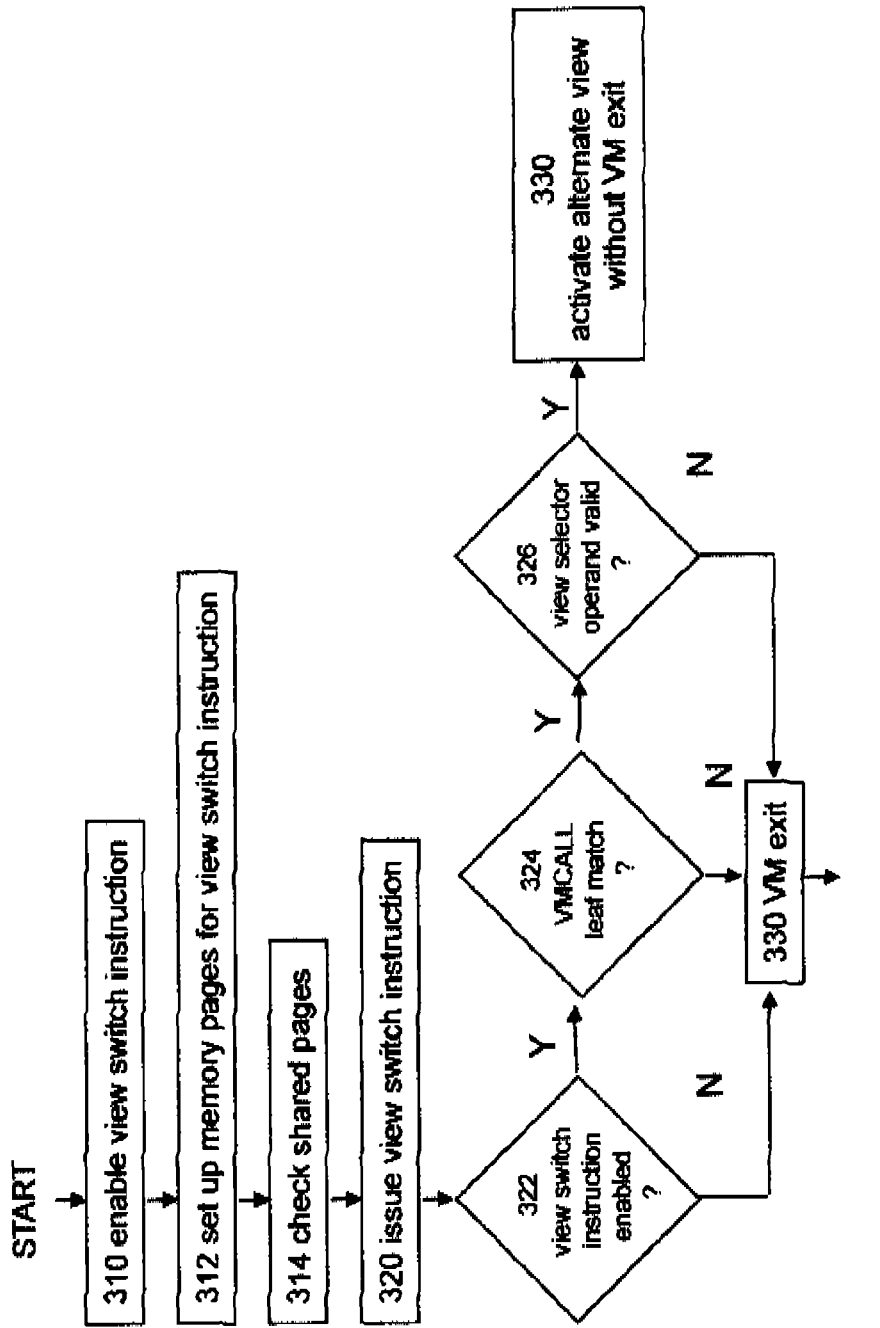
FIG. 3 is a flow diagram illustrating a method of managing virtual machine page tables with low latency according to an embodiment of the present invention.

FIG. 3 illustrates a method of managing virtual machine page tables with low latency according to an embodiment of the present invention.

In block 310, the VMM enables the use of the view switch instruction. In one embodiment, the VMM sets a control to enable the use of the view switch instruction to allow guest software to change the active permission view for an active guest VM without a VM exit.

In block 312, the VMM sets up memory pages on which a legal view switch instruction may be placed to be shared with read and execute (no write) policy in all the views across which a switch is to be allowed. In block 314, any read-execute page that is shared across more than one view may be white-listed (i.e., checked once by the anti-malware agent) to ensure that there are no spuriously or maliciously inserted view switch instruction invocations in the shared pages.

In block 320, the anti-malware agent issues a view switch instruction. In block 322, it is determined whether the use of the view switch instruction is enabled. In block 324, it is determined whether the VMCALL leaf programmed by the VMM matches the VMCALL operand. In block 326, it is determined whether the view selector operand is valid. In block 328, the alternate permission view is activated without a VM exit.

In block 330, a VM exit occurs with a VMCALL exit reason.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. A processor, comprising:
   instruction hardware to receive a view switch instruction from guest software; and
   execution hardware to determine whether an operand of the view switch instruction in the guest software matches a value of an instruction leaf execution control field and, in response to determining that the operand matches the value, execute the view switch instruction to load an alternate permission view;
      wherein the processor is to operate in a virtual machine extension root mode and a virtual machine extension non-root mode, and the execution hardware is to execute the view switch instruction in non-root mode without a transfer of control from the guest software to a virtual machine monitor.

2. A method, comprising:
   receiving, by a processor in virtual machine extension non-root mode, a view switch instruction from guest software;
   determining, by the processor, that an operand of the view switch instruction matches a value of an instruction leaf execution control field; and
   executing, by the processor in response to determining that that operand matches the value, the view switch instruction to load an alternate permission view without a transfer of control from the guest software to a virtual machine monitor.

3. A system, comprising:
   memory; and
   a processor to operate in a virtual machine extension root mode and a virtual machine extension non-root mode, the processor including instruction hardware to receive a view switch instruction from guest software; and execution hardware to determine whether an operand of the view switch instruction in the guest software matches a value of an instruction leaf execution control field and, in response to determining that the operand matches the value, execute the view switch instruction in non-root mode to load an alternate permission view without a transfer of control from the guest software to a virtual machine monitor.

* * * * *